United States Patent [19]

Widmer

[11] Patent Number: 5,039,124
[45] Date of Patent: Aug. 13, 1991

[54] MOTOR VEHICLE FRAME AND SUSPENSION ASSEMBLY

[75] Inventor: Gerald L. Widmer, Loda, Ill.

[73] Assignee: Computer Design Chassis, Inc., Paxton, Ill.

[21] Appl. No.: 433,599

[22] Filed: Nov. 6, 1989

[51] Int. Cl.⁵ .......................................... B60G 11/26
[52] U.S. Cl. .................... 280/711; 267/256; 267/31
[58] Field of Search ............. 280/104, 676, 677, 678, 280/689, 690, 697, 698, 700, 702, 704, 711, 712, 713; 267/259, 256, 31, 273

[56] References Cited

U.S. PATENT DOCUMENTS

| | | | |
|---|---|---|---|
| 2,290,620 | 7/1942 | Brown | 280/711 |
| 2,995,355 | 8/1961 | Stump | 280/711 |
| 3,707,298 | 12/1972 | Henry et al. | 280/717 |
| 3,746,363 | 7/1973 | Borns | 280/690 |
| 3,771,812 | 11/1973 | Pierce et al. | 280/704 |
| 3,774,948 | 11/1973 | Gouirand | 280/711 |
| 3,817,550 | 6/1974 | Young | 280/680 |
| 3,850,445 | 11/1974 | Borns et al. | 280/712 |
| 3,920,283 | 11/1975 | Strader | 303/100 |
| 3,921,999 | 11/1975 | Masser | 280/676 |
| 3,960,388 | 6/1976 | Strader et al. | 280/693 |
| 4,193,612 | 3/1980 | Masser | 280/681 |
| 4,262,929 | 4/1981 | Pierce | 280/713 |
| 4,322,061 | 3/1982 | Masser | 267/269 |
| 4,379,572 | 4/1983 | Hedenberg | 280/713 |
| 4,405,154 | 9/1983 | Masser | 280/686 |
| 4,553,773 | 11/1985 | Pierce | 280/676 |
| 4,580,798 | 4/1986 | Roelofs | 280/698 |
| 4,580,809 | 4/1986 | Leaf | 280/712 |
| 4,595,216 | 6/1986 | Ware | 280/661 |
| 4,596,402 | 6/1986 | Raidel | 280/711 |
| 4,615,539 | 10/1986 | Pierce | 280/690 |
| 4,634,141 | 1/1987 | Hagan et al. | 280/704 |
| 4,693,486 | 9/1987 | Pierce et al. | 280/80.1 |
| 4,700,968 | 10/1987 | Cherry | 280/704 |
| 4,729,579 | 3/1988 | Hagan et al. | 280/704 |
| 4,736,958 | 4/1988 | Armstrong | 280/840 |

FOREIGN PATENT DOCUMENTS

| | | | |
|---|---|---|---|
| 848416 | 9/1960 | United Kingdom | 280/702 |
| 2139971 | 11/1984 | United Kingdom | 280/711 |

OTHER PUBLICATIONS

Brochure of *Air Lift Company*.
Brochure of *Air-Ax Suspension Systems*.
Brochure of *Dyneer*, Granning Division, Models RD 1000, RD 740, RT 500 Air Suspensions.
Flyer of *E-Z Ride Suspensions*, CLS 9500/8500, MTS 1800, CAC 1400 Suspensions.
Advertisement for *Hendrickson Turner*.
Brochure for *Henschen Industrial*, composite multi-axle.
Brochure of *Jet Company*.
Neway Corp., Service parts/price book, Effective Sep. 15, 1989, Form No. 829.
Advertisement for *Reyco Transpro, Reyco Industries, Inc.*, Model 87, 86, 88.
Flyers for *Silent Drive, Inc.*, Suspension Component Group Model AD-310, ALD-320.
Advertisement for *Silent Drive, Inc.*
Illustrated installation instructions for *Silent Drive, Inc.* Suspension Component Group, Model ALD-330.
Advertisement for *RV Products, Inc.* Model T-9AH.
Advertisement for *Ridewell Suspensions*.

Primary Examiner—Charles A. Marmor
Assistant Examiner—Tamara L. Finlay
Attorney, Agent, or Firm—Lockwood, Alex, FitzGibbon & Cummings

[57] ABSTRACT

A frame and suspension assembly is capable of a low frame rail orientation and enhanced on-road stability when incorporated in a motor vehicle. An air spring suspension system is mounted outwardly of the frame rails and the frame rails include a reinforced notch to provide the required structural clearance for the rear axle to compensate for the low-to-the-ground frame rail positioning. An anti-sway bar which spans the distance between the two sides of the frame is also included for further stabilization.

39 Claims, 4 Drawing Sheets

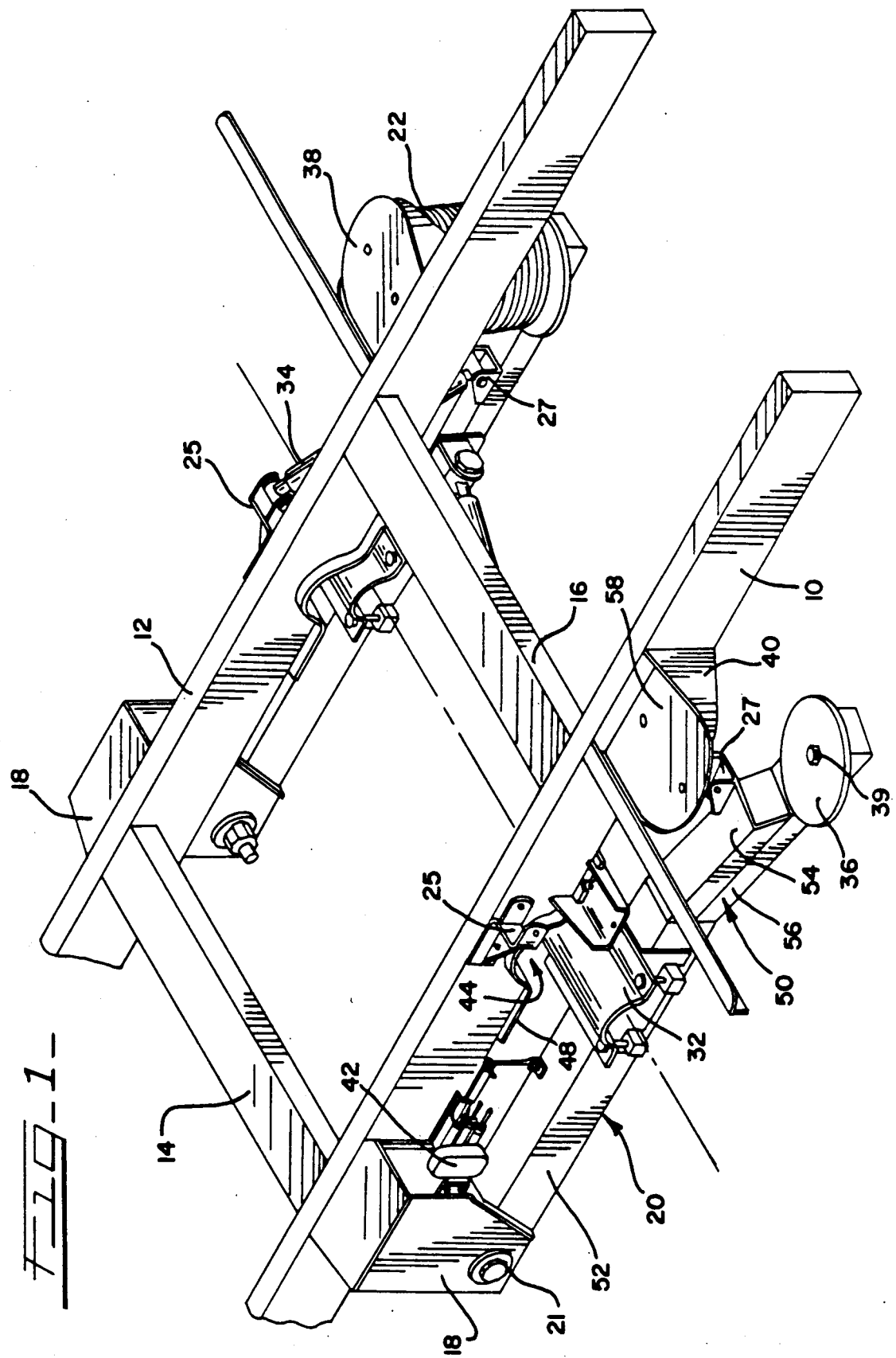

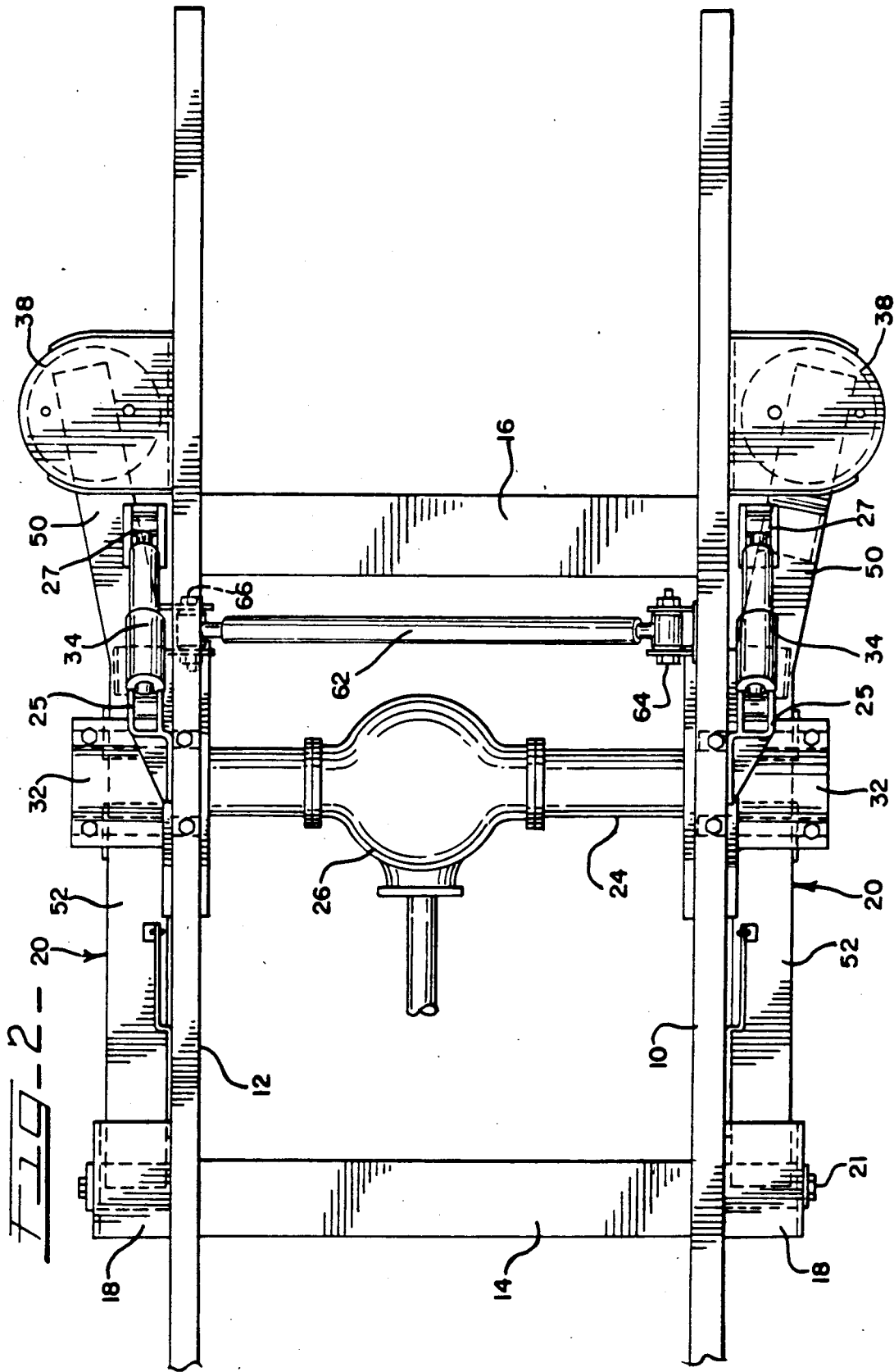

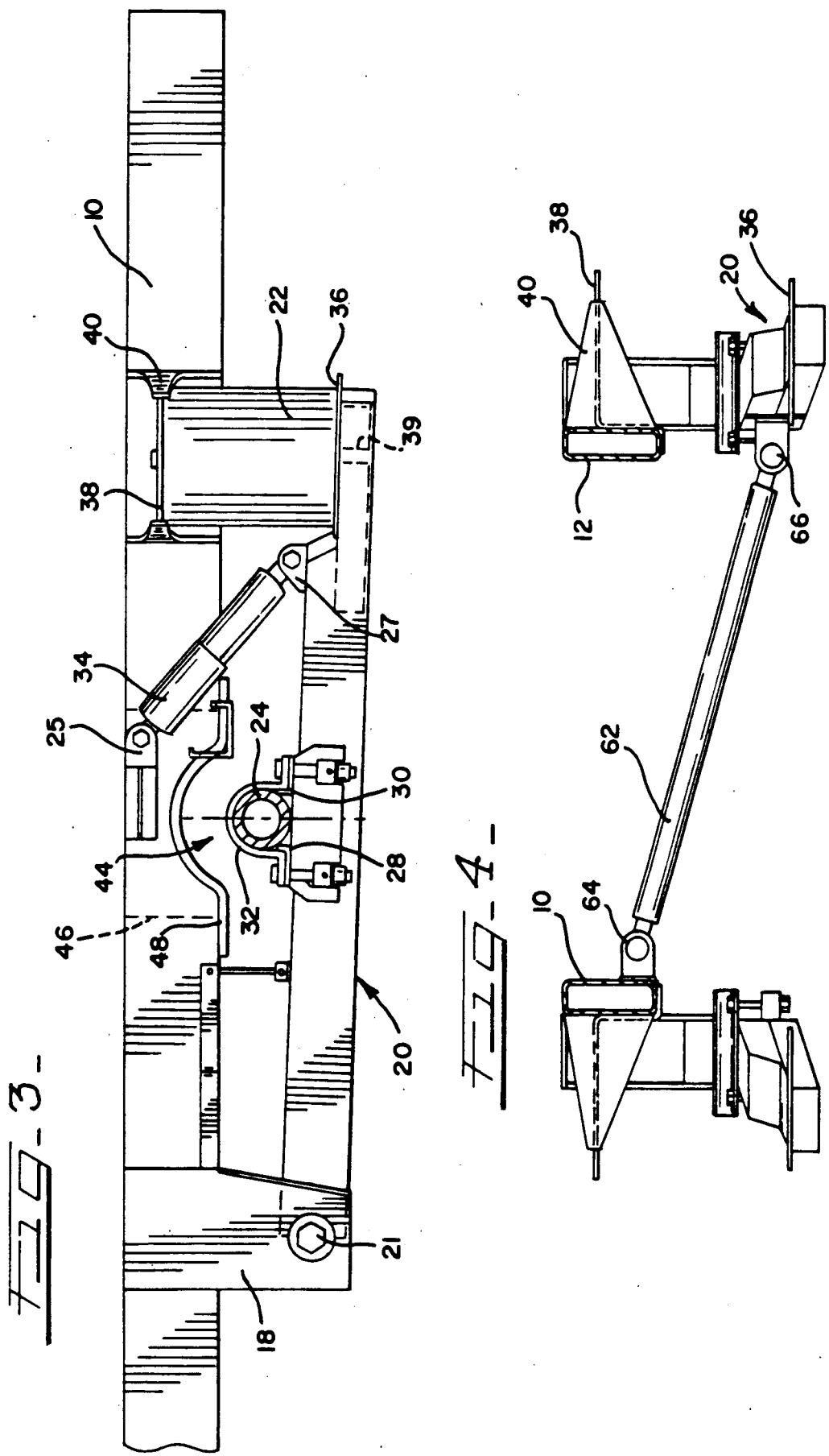

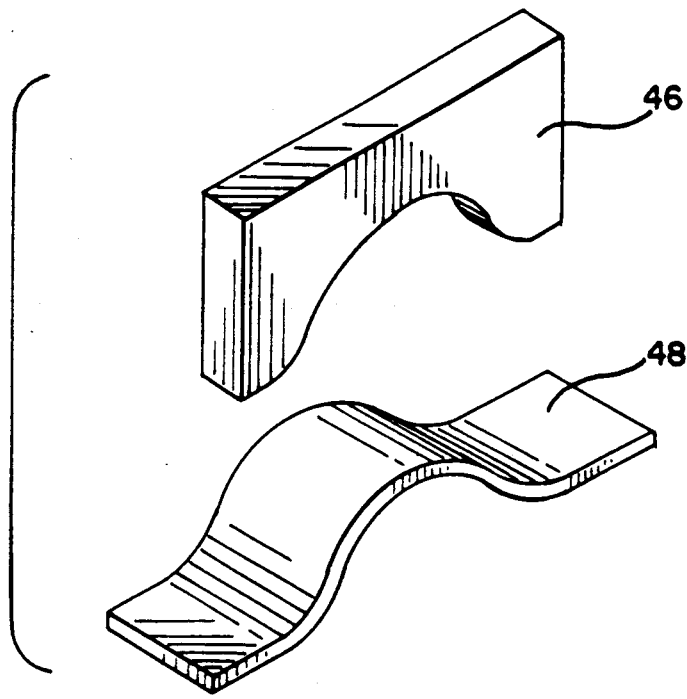
Fig_5_
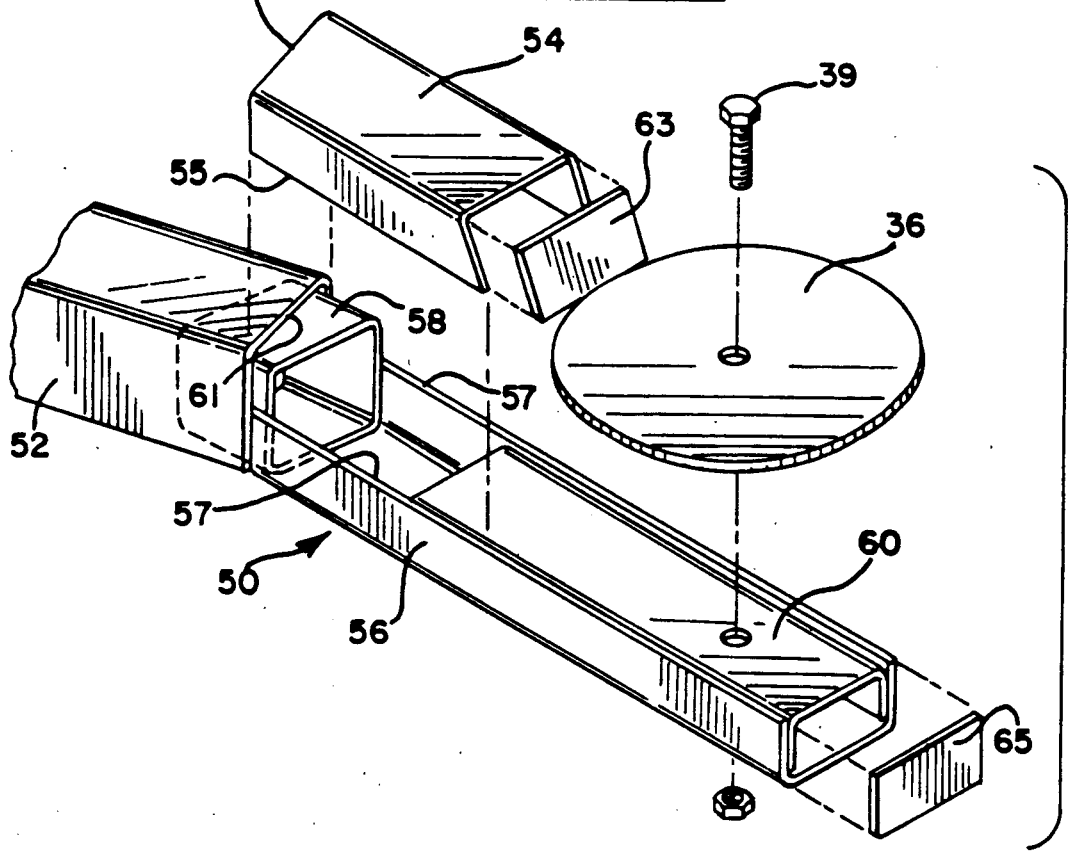
Fig_6_

MOTOR VEHICLE FRAME AND SUSPENSION ASSEMBLY

BACKGROUND AND BRIEF DESCRIPTION

The present invention relates to a frame and suspension assembly for motor vehicles. More specifically, the invention relates to a frame and suspension assembly having stabilizing means associated therewith wherein the assembly, when incorporated in a vehicle presents a low frame rail height above ground. The assembly of the present invention includes an air spring suspension system mounted outwardly of the frame rails to thereby provide the aforementioned low frame rail height and to provide improved stabilization for a motorized vehicle. A reinforced notch in each of the frame rails of the assembly maintains adequate clearance for the rear axle of the vehicle and an anti-sway bar is positioned to prevent excessive swaying of the frame.

Frame assemblies for motor vehicles such as light trucks are known in the prior art which have incorporated various means for stabilizing the vehicle to prevent excessive bounce and sway and the like during operation. Such frame assemblies have included air spring suspension systems and anti-sway bars. The air springs suspension systems generally include a walking beam or trailing arm pivotally mounted to a mounting bracket and extending rearwardly to an air spring mounted between the walking beam and the bottom of the frame rail so that the entire frame rail is positioned on top of the air spring. Anti-sway bars are often mounted to the differential housing and to one of the frame rails of the assembly.

Although the prior assemblies incorporating air spring suspension systems and anti-sway bars have provided a measure of stabilization for vehicles incorporating those assemblies, they heretofore could not be incorporated in a vehicle to provide a low frame rail height so that light duty trucks, such as delivery trucks and the like can be constructed with lower load carrying surfaces or compartments which can be loaded and unloaded with less effort than is required with more conventional truck designs. Previous assemblies which utilize an air spring suspension system have failed to provide a high degree of frame stability while also providing the aforementioned low frame rail height. This is because it has been difficult in such assemblies to simultaneously lower the frame rail height while maintaining adequate structural clearance for the rear axle and at the same time providing a high degree of on-road stability which is at least comparable or better than has been previously possible.

The present invention overcomes the shortcomings of the prior art by providing a frame and suspension assembly for motor vehicles such as delivery and other light duty trucks where it is desirable to have a low chassis frame height. The assembly of the invention includes a pair of frame rails having reinforced notches over the rear axle housing. An air spring suspension system is mounted outwardly of the frame rails along a pivotally mounted walking beam which extends from a mounting bracket rearwardly along the frame rail to an air spring mounted between upper and lower mounting plates. The air spring mounting plates extend outwardly from the frame for positioning of the air springs therebetween in a manner which allows each frame rail to be lower to the ground than was previously possible. The rear axle extends transversely underneath the parallel frame rails and is affixed at its ends to the walking beams. A reinforced notch is provided in each of the frame rails to provide structural clearance for the rear axle to maintain the frame rails in their low-to-the-ground position, as is further discussed and described herein Positioning of an air spring suspension system outwardly of the frame rails provides, in addition to a lower chassis frame height, improved suspension and overall stability. An anti-sway bar is preferably mounted behind the rear axle and positioned between a frame rail and the opposing walking beam which also stabilizes the assembly. The frame and suspension assembly is preferably constructed to prevent the rear axle and the differential from rising above the tops of the frame rails even when the frame and suspension assembly is subject to heavy loads. Accordingly, the body of the motor vehicle incorporating the frame assembly to the present invention does not have to be raised to accommodate the differential or axle housing thereby allowing a vehicle manufacturer to maintain the load carrying portion of the vehicle in a low-to-the-ground position for easy access thereto.

It is accordingly an object of the present invention to provide a frame and suspension assembly for a motorized vehicle.

It is another object of the present invention to provide a frame and suspension assembly having a low frame rail height when incorporated in a motor vehicle.

These and other objects and advantages of the present invention will be readily understood by those skilled in the art upon further consideration of the remainder of the disclosure.

BRIEF DESCRIPTION OF THE DRAWINGS

FIG. 1 is a broken perspective view of the rear portion of the frame assembly of the present invention;

FIG. 2 is a broken plan view of the rearmost portion of the frame and suspension assembly of the present invention;

FIG. 3 is a broken side elevation view of the frame assembly of FIG. 2;

FIG. 4 is a rear elevation view of a portion of the assembly of FIG. 2 showing the positioning of the anti-sway bar therein;

FIG. 5 is an exploded view of a reinforcement means used to reinforce the frame rail in the assembly of present invention; and FIG. 6 is an exploded broken perspective view of an embodiment of a lower mounting plate for an air spring according to the present invention.

DETAILED DESCRIPTION OF THE PREFERRED EMBODIMENT OF THE INVENTION

A frame assembly made according to the principles of the present invention can be incorporated in a motorized vehicle such as a delivery truck, for example, to provide a low frame rail height which, in turn, allows the vehicle to be manufactured with a load carrying surface or compartment which is also low to the ground. In this manner, such a vehicle can be loaded and/or unloaded more conveniently since less effort is required to lift objects from the ground up to the lowered load carrying surface or compartment and vice versa. In describing the preferred embodiment, reference is made to the various figures and reference numerals are used to indicate the structure described and discussed herein.

Referring generally to FIGS. 1-3, the rearmost portion of the frame and suspension assembly of the present invention is shown. The assembly includes a pair of frame rails 10 and 12 which are connected by at least one cross member 14 and at least one torsion bar 16. The assembly incorporates an air spring suspension system in operative association with the frame rails 10 and 12. Identical components for the aforementioned air spring suspension system are positioned along both frame rails 10 and 12 and, for ease of explanation, the description herein is limited to the portion of the air spring suspension system associated with the left frame rail 10 as is most clearly illustrated in FIG. 3.

The suspension system includes a front walking beam mounting bracket 18 with a walking beam 20 pivotally mounted thereto at 21. The walking beam 20 is mounted to bracket 18 in a conventional manner and extends rearwardly below the frame rail 10. An air spring 22 is positioned at the rearmost end of the walking beam 20. The rear axle 24 extends transversely beneath the frame rails 10 and 12 and is secured to the walking beam 20 with L-shaped axle mounting plates 28, 30 and axle cap mounting plate 32. As is shown most clearly in FIG. 3, the axle 24 is positioned between the left and right L-shaped axle mounting plates 28, 30 respectively. Each L-shaped axle mounting plate is secured to the walking beam 20, preferably by welding, to prevent displacement of the axle 24 along the walking beam 20 during motorized operation of a vehicle. The axle cap mounting plate 32 is bolted over the axle 24 to prevent vertical displacement thereof and a shock absorber 34 is attached at its ends to shock absorber brackets 25 and 27 affixed to the frame rail 10 and to the walking beam 20, respectively.

In accordance with the principals of the present invention, the air spring suspension system is configured so that the air spring 22 is mounted outwardly of the frame rail 10. Preferably, the air spring 22 is mounted between lower and upper air bag mounting plates 36, 38 respectively. The lower mounting plate 36 is positioned at the rearmost portion of the walking beam 20 and may be secured thereto by a single bolt 39 extending through the lower plate 36 and through the portion of the walking beam supporting that plate.

The upper air spring mounting plate 38 includes flanges 40 affixed thereto and the plate 38 and flanges 40 are secured to the outermost vertical face of frame rail 10 by welding, for example. As shown, the upper mounting plate 38 is positioned along the outer surface of the frame rail to project outwardly therefrom in a perpendicular relationship with the rail 10 so that the air spring 22, when mounted between plates 36 and 38, projects above the lowermost edge of the frame rail 10.

Positioning of the air spring 22 outwardly from the frame rail provides certain advantages over the prior art. Since the air spring 22 is not positioned underneath the frame rails, the lowermost edge of each of the frame rails may extend below the upper mounting plates 38 to provide the desired low frame rail configuration for the frame and suspension assembly of the present invention. Additionally, the suspension system provides improved stability to a vehicle incorporating the assembly herein. More specifically, the placement of air springs 22 outwardly from frame rails 10 and 12 provides an increased center to center distance between the air springs which, in turn, gives greater stability to the associated motor vehicle. Preferably, the center to center distance between the two air springs 22 is between about three and a half feet to about four feet. Further, improved stability can be realized in the choice of air spring incorporated in the assembly. A large diameter air spring will generally require less air pressure to provide a smoother and more stable ride. In this regard, an air spring having a diameter of about ten inches is preferred.

Pneumatic control means are provided to adjust the air pressure within the air springs 22. As shown in FIG. 1, a control valve 42 may be mounted to the walking beam mounting bracket 18 and above the walking beam 20 for pneumatic control of the air bags 22. The two air bags 22 may be inflated and deflated as need requires according to the load being carried by the vehicle incorporating the frame and suspension assembly of the present invention. Preferably, the air springs 22 may be inflated and/or deflated independently.

As will be appreciated by those skilled in the art, the clearance of the rear axle 24 is generally fixed by industry standards, as well as by regulations. Accordingly, it is both desirable and necessary to provide a frame and suspension assembly which is constructed in compliance with those standards and regulations. In this regard, the assembly of the invention is constructed to provide a rear axle clearance of no less than seven inches while providing and maintaining a minimum frame rail height of about twenty three inches. Additionally, each of the frame rails 10 and 12 are provided with a notch, generally indicated at 44, to provide structural clearance for the rear axle 24 under normal on-road operating conditions. In a standard frame rail having a vertical dimension of about six inches, a notch 44 having a height of approximately three inches and having a base measure of between about seven and about twelve inches and, most preferably, about nine inches, will be sufficient to provide the required clearance.

The notched frame rail will require reinforcement. In this regard, reinforcement means are provided in the form of reinforcing plate member 46 and reinforcing cap member 48. Plate member 46 is preferably welded to the cap member 48. As is shown in FIG. 5, the cap member is a curved strip of material which is formed in the same configuration as the notch 44 and the reinforcing plate member 46 is compatibly configured to rest upon the cap member 48 and to extend upwardly therefrom within the frame rail 10. Preferably, cap member 48 will be made of solid steel having a thickness of about one-half inch, a width of about four inches and will have a length sufficient to extend beyond the lateral edges of the notch. In this regard, a cap member 48 having a length of about seventeen inches will generally be adequate to cover a notch having a base measure of about nine inches. Reinforcing plate member 46 is preferably made of solid steel with a thickness of between about one inch and about two inches and, most preferably about one and one-half inches and is preferably dimensioned to have a height of between about five and one half inches and about six inches and a length of about twelve inches.

The aforementioned configuration for the reinforcement means when positioned within the frame rails 10 and 12, will provide adequate reinforcement for the notched area of each frame rail to compensate for the decreased structural strength of the frame rails as a result of notches 44 therein.

Each notch 44 will provide the necessary clearance between the rear axle 24 and the frame rails 10 and 12 when the assembly is incorporated in a motor vehicle and operated under on-road conditions. The reinforcement means preserve the structural integrity of the frame rails while the mounting of air bags 22 outside of frame rails 10 and 12 allows each frame rail to rest in a low-to-the-ground orientation. In this regard, it should be noted that a conventional walking beam for an air spring suspension system is generally dimensioned to have a vertical measure of about four inches when positioned within a frame assembly. In the frame assembly of the present invention, however, the walking beam 20 is preferably dimensioned to have a vertical measure of about two inches. In this manner, sufficient clearance is maintained between the ground and the bottom edge of the walking beam 20 when the assembly is incorporated in a motor vehicle.

As mentioned, the lower air spring mounting plate 36 supports the air spring 22 on the walking beam 20 outwardly of frame rails 10 and 12. In this regard, the walking beam 20 is preferably formed with an angled arm portion 50 for positioning of the lower air spring mounting plate 36 thereon as shown in FIG. 6. The angled arm portion 50 extends at an angle from the body portion 52 of the walking beam, and at an acute angle relative to the frame rail associated therewith, to properly orient the lower air spring mounting plate 36 for outward mounting of the air springs 22.

The body portion 52 is positioned substantially parallel to frame rail 10 for proper support of axle 24 thereon. Referring specifically to FIG. 6, the angled arm portion 50 may be constructed with upper and lower U-shaped halves 54 and 56, respectively. The halves 54, 56 are affixed to each other, preferably by welding, and a connecting sleeve 58 fits within the end of body portion 52 for attaching the angled arm portion 50 thereto. In this regard, the connecting sleeve 58 is preferably dimensioned to easily fit within both the body portion 52 and arm portion 50 while providing enough clearance therein to permit the required angling of the angled arm portion 50. Connecting sleeve 58 is preferably welded to angled portion 50 and body portion 52 to provide structural rigidity to the walking beam 20.

The upper U-shaped half 54 preferably extends only partially along the length of angled portion 50 where it terminates to provide an area for positioning lower air bag mounting plate 36 thereon. As shown in FIG. 6, the upper half 54 is compatably dimensioned to fit over connecting sleeve 58. In this manner, the lower edges 55 of upper half 54 can be affixed to the uppermost edges 57 of lower half 56 by welding, for example. The forward edge 59 of upper half 54 is angled to provide the desired outward bend for the angled arm portion 50 while simultaneously providing an edge to edge fit with the rearmost edge 61 of body portion 52. Additional reinforcement means in the form of a U-shaped sleeve 60 may be positioned within the lower half 56 to both reinforce the rearmost portion of the angle arm portion 50 and to provide a suitable surface for mounting the lower air bag mounting plate 36 thereon. End plates 63 and 65 are affixed to the rearmost edges of upper half 54 and lower half 56, respectively, to seal the walking beam 20 against dust, dirt, grease and the like.

Additional stabilization means are preferably provided in the form of an anti-sway bar 62 as shown in FIGS. 2 and 4. The anti-sway bar 62 is preferably pivotally attached at one end 64 to one of the frame rails 10 and at the other end 66 to a walking beam 20 on the opposite side of the frame assembly. In this manner, the axle housing and, more specifically, the differential housing 26 is relieved of the stresses and strains associated with normal road operation for a vehicle incorporating the assembly of the present invention. In contrast to prior art assemblies, the two sides of the frame and suspension assembly in the present invention are directly connected by anti-sway bar 62 rather than having the sway bar connected to the differential housing and to one of the walking beams 20 or one of the frame rails 10 or 12.

In the assemblies described herein, the rear axle 24 and differential 26 will be mounted on walking beams 20 in a manner which maintains the position of the differential housing below the top of frame rails 10 and 12 even under heavy load conditions. In the assembly of the invention, a clearance of between about six and about eight inches between the rear axle mounting cap plate 32 and the top of frame rails 10 and 12 will provide the aforementioned preferred position of the differential housing even under heavy load conditions. Those skilled in the art will appreciate that proper air pressure within air springs 22 will help to maintain this preferred clearance in conjunction with the proper selection and maintenance of shock absorbers 34.

The above-described frame and suspension assembly presents a substantially unobstructed area thereabove so that a vehicle body may be mounted directly on the frame rails without having to be raised to accommodate the differential or other elements of the assembly. In this manner, the vehicle manufacturer may take full advantage of the low frame rail height by positioning the load carrying area of the vehicle directly on the frame rails so that the vehicle is provided with a low-to-the-ground load bearing area. In accordance with the teachings of the present invention, such a vehicle can be loaded and unloaded with less effort than has been previously required. Specifically, the lowered load carrying area provides easy access thereto because less effort will be required by those moving a load from the ground up to the lowered load carrying area of the vehicle and vice versa.

The frame and suspension assembly of the present invention has specific applicability to light duty trucks and the like. More specifically, pick-up trucks, delivery trucks of various configurations and even service vehicles such as ambulances may be advantageously manufactured with a frame assembly constructed in accordance with the teachings of the present invention.

Although a preferred embodiment of the present invention has been discussed and described herein, those skilled in the art will appreciate that various modifications may be made thereto without departing from the true spirit and scope of the present invention.

I claim:

1. A frame and suspension assembly for a motorized vehicle having a front and rear axle, the assembly having a pair of parallel frame rails and an air spring suspension system associated with the frame rails, and wherein the air spring suspension system includes a walking beam mounting bracket attached to each of the frame rails, a walking beam pivotally affixed at one end thereof to each mounting bracket and an air spring operatively associated with each walking beam and each frame rail, the assembly comprising:

air spring mounting means for positioning an air spring adjacent to each of the frame rails, the top of said air spring extending above the bottom surface of each said frame rail when said air spring is positioned on said air spring mounting means;

a notch in each of said frame rails above said walking beam, said notch positioned in each of said frame rail to provide structural clearance for the rear axle when said rear axle is secured to said walking beam; and reinforcement means in said frame rail to structurally reinforce said frame rail around said notch, said reinforcement means including a plate member extending into said frame rail above said notch.

2. The assembly of claim 1 wherein said mounting means include lower and upper air spring mounting plates for retaining said air spring therebetween, said upper air spring mounting plate being affixed to said frame rail and extending outwardly from one side of said frame rail, said lower air spring mounting plate being affixed to said walking beam substantially parallel to said upper air spring mounting plate.

3. The assembly of claim 1 wherein said reinforcement means further includes a cap member, said cap member configured to conform to the shape of said notch such that said plate member extends vertically above said cap member, said cap member affixed to said frame rail at said notch.

4. The assembly of claim 3 wherein said plate member is made of steel having a thickness of between about one inch and about two inches.

5. The assembly of claim 1 wherein said assembly further includes a pair of shock absorbers associated therewith, each said shock absorber being affixed to one of said frame rails and one of said walking beams.

6. The assembly of claim 1 wherein each said walking beam includes a body portion and an arm portion, said body portion being pivotally affixed to a mounting bracket and extending rearwardly along one of said frame rails, said arm portion being affixed to and extending from an end of said body portion, each said arm portion being angled with respect to said body portion to extend away from said frame rail.

7. The assembly of claim 6 wherein each said angled arm portion has a lower air spring mounting plate affixed thereto for mounting one of said air springs thereon.

8. The assembly of claim 1 wherein said walking beam has a vertical dimension of about two inches when said walking beam is affixed to said mounting bracket.

9. The assembly of claim 1 wherein said notch is dimensioned to have vertical measure of about three inches.

10. The assembly of claim 9 wherein said notch is dimensioned to have a base measure of between about seven inches and about twelve inches.

11. The assembly of claim 1 wherein said air spring is mounted adjacent said frame rails so that a pair of said air springs, when mounted, have a center to center distance of between about three and one-half feet and about four feet.

12. The assembly of claim 1 wherein said air spring has a diameter of about ten inches.

13. The assembly of claim 1 further comprising an anti-sway bar mounted to one of said walking beams and one of said frame rails.

14. The assembly of claim 13 wherein said anti-sway bar is positioned on said assembly behind said rear axle.

15. The assembly of claim 1 wherein said mounting means include lower and upper air spring mounting plates for retaining said air spring therebetween, said upper air spring mounting plate being affixed to said frame rail and wherein said reinforcement means includes a plate member and a cap member, said cap member configured to conform to the shape of said notch and said plate member affixed to and extending vertically above said cap member and into said frame rail and above said notch, and wherein each said walking beam includes a body portion and an arm portion, said body portion being pivotally affixed to a mounting bracket and extending rearwardly along one of said frame rails, said arm portion being affixed to and extending from an end of said body portion, each said arm portion being angled with respect to said body portion to extend away from said frame rail, said lower air spring mounting plate being affixed to said arm portion for mounting said air spring thereon.

16. A frame and suspension assembly for a motorized vehicle having a front and rear axle, the assembly having a pair of parallel frame rails and an air spring suspension system associated with the frame rails, and wherein the air spring suspension system includes a walking beam mounting bracket attached to each of the frame rails, a walking beam pivotally affixed at one end thereof to each mounting bracket thereby securing the position of the walking beam at its one end relative to the frame rail, and an air spring operatively associated with each walking beam and each frame rail, the assembly comprising:

air spring mounting means for positioning an air spring adjacent to each of the frame rails, the top of said air spring extending above the bottom surface of each said frame rail when said air spring is positioned on said air spring mounting means;

a notch in each of said frame rails above said walking beam, said notch positioned in each said frame rail to provide structural clearance for the rear axle when said rear axle is secured to said walking beam; and reinforcement means in said frame rail to structurally reinforce said frame rail around said notch, said reinforcement means including a plate member and a cap member, said cap member configured to conform to the shape of said notch and said plate member affixed to and extending vertically above said cap member into said frame rail and above said notch.

17. The assembly of claim 16 wherein said mounting means include lower and upper air spring mounting plates for retaining said air spring therebetween, said upper air spring mounting plate being affixed to said frame rail and extending outwardly from one side of said frame rail, said lower air spring mounting plate being affixed to said walking beam substantially parallel to said upper air spring mounting plate.

18. The assembly of claim 16 wherein said plate member is made of steel having a thickness of between about one inch and about two inches.

19. The assembly of claim 16 wherein each said walking beam includes a body portion and an arm portion, said body portion being pivotally affixed to amounting bracket and extending rearwardly along one of said frame rails, said arm position being affixed to and extending from an end of said body portion, each said arm portion being angled with respect to said body portion to extend away from said frame rail.

20. The assembly of claim 19 wherein each said angled arm portion has a lower air spring mounting plate affixed thereto for mounting one of said air springs thereon.

21. The assembly of claim 16 wherein said notch is dimensioned to have a vertical measure of about three inches.

22. The assembly of claim 16 wherein said air spring is mounted adjacent said frame rails so that a pair of said air springs, when mounted, have a center to center distance of between about three and one-half feet ad about four feet.

23. The assembly of claim 16 wherein said air spring has a diameter of about ten inches.

24. The assembly of claim 16 further comprising an anti-sway bar mounted to one of said walking beams and one of said frame rails.

25. The assembly of claim 24 wherein said anti-sway bar is positioned on said assembly behind said rear axle.

26. A frame means suspension assembly for a motorized vehicle having a front and rear axle, the assembly having a pair of parallel frame rails and an air spring suspension system associated with the frame rails, and wherein the air spring suspension system includes a walking beam mounting bracket attached to each of the frame rails, a walking beam pivotally affixed at one end thereof to each mounting bracket thereby securing the position of the walking beam at is one end relative to the frame rail, and an air spring operatively associated with each walking beam and each frame rail, the assembly comprising:
 air spring mounting means for positioning an air spring adjacent to each of the frame rails, the top of said air spring extending above the bottom surface of each said frame rail when said air spring is positioned on said air spring mounting means;
 a notch in each of said frame rails above said walking beam, said notch positioned in each said frame rail to provide structural clearance for the rear axle when said rear axle is secured to said walking beam; and
 reinforcement means in said frame rail to structurally reinforce said frame rail around said notch, said reinforcement means including a plate member and a cap member, said cap member configured to conform to the shape of said notch and said plate member affixed to and extending vertically above said cap member and into said frame rail and above said notch, said plate member being made of steel having a thickness of between about one inch and about two inches.

27. The assembly of claim 26 wherein each said walking beam includes a body portion and an arm portion, said body portion being pivotally affixed to a mounting bracket and extending rearwardly along one of said frame rails, said arm portion being affixed to and extending from an end of said body portion, each said arm portion being angled with respect to said body portion to extend away from said frame rail.

28. The assembly of claim 27 wherein each said angled arm portion has a lower air spring mounting plate affixed thereto for mounting one of said air springs thereon.

29. The assembly of claim 26 wherein said notch is dimensioned to have vertical measure of about three inches.

30. The assembly of claim 26 wherein said air spring is mounted adjacent said frame rails so that a pair of said air springs, when mounted, have a center to center distance of between about three and one-half feet and about four feet.

31. The assembly of claim 26 wherein said air spring has a diameter of about ten inches.

32. The assembly of claim 26 further comprising an anti-sway bar mounted to one of said walking beams and one of said frame rails.

33. The assembly of claim 32 wherein said anti-sway bar is positioned on said assembly behind said rear axle.

34. A frame and suspension assembly for a motorized vehicle having a front and rear axle, the assembly having a pair of parallel frame rails and an air spring suspension system associated with the frame rails, and wherein the air spring suspension system includes a walking beam mounting bracket attached to each of the frame rails, a walking beam pivotally affixed at one end thereof to each mounting bracket thereby securing the position of the walking beam at its one end relative to the frame rail, and an air spring operatively associated with each walking beam and each frame rail, the assembly comprising:
 air spring mounting means for positioning an air spring adjacent to each of the frame rails, said mounting means including lower and upper air spring mounting plates for retaining said air spring therebetween, said upper air spring mounting plate being affixed to said frame rail such that the top of said air spring extends above the bottom surface of each said frame rail when said air spring is positioned on said air spring mounting means;
 a notch in each of said frame rails above said walking beam, said notch positioned in each of said frame rail to provide structural clearance for the rear axle when said rear axle is secured to said walking beam;
 each said walking beam including a body portion and an arm portion, said body portion being pivotally affixed to a mounting bracket and extending rearwardly along one of said frame rails, said arm portion being affixed to and extending from an end of said body portion, each said arm portion being angled with resect to said body portion to extend away from said frame rail, said lower air spring mounting plate being affixed to said arm portion for mounting said air spring thereon; and
 reinforcement means in said frame rail to structurally reinforce said frame rail around said notch, said reinforcement means including a plate member and a cap member, said cap member configured to conform to the shape of said notch, plate member affixed to and extending vertically above said cap member and into said frame rail above said notch.

35. The assembly of claim 34 wherein aid notch is dimensioned to have vertical measure of about three inches.

36. The assembly of claim 34 wherein said air spring is mounted adjacent said frame rails so that a pair of said air springs, when mounted, have a center to center distance of between about three and one-half feet and about four feet.

37. The assembly of claim 34 wherein said air spring has a diameter of about ten inches.

38. The assembly of claim 34 further comprising an anti-sway bar mounted to one of said walking beams and one of sad frame rails.

39. The assembly of claim 38 wherein said anti-sway bar is positioned on said assembly behind said rear axle.

* * * * *